(12) United States Patent
Hawkins et al.

(10) Patent No.: US 8,178,647 B2
(45) Date of Patent: May 15, 2012

(54) COPOLYESTER ETHER ELASTOMER COMPOSITIONS AND METHODS OF MAKING COPOLYESTER ETHER ELASTOMER COMPOSITIONS

(75) Inventors: Gary Stuart Hawkins, Johson City, TN (US); Johnson Thomas, Johnson City, TN (US); Joshua Brock Thomas, Gray, TN (US); David Ray Arnold, Piney Flats, TN (US); Jeff Scott Howell, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 12/868,373

(22) Filed: Aug. 25, 2010

(65) Prior Publication Data

US 2012/0053568 A1   Mar. 1, 2012

(51) Int. Cl.
*C08G 64/00* (2006.01)
*C08G 63/02* (2006.01)

(52) U.S. Cl. .......... 528/272; 525/88; 525/92 R; 528/271

(58) Field of Classification Search ............... 525/88, 525/92 R; 528/271, 272
See application file for complete search history.

(56) References Cited

U.S. PATENT DOCUMENTS

| | | | |
|---|---|---|---|
| 4,627,844 A | 12/1986 | Schmitt | |
| 5,550,190 A | 8/1996 | Hasegawa et al. | |
| 5,910,540 A | 6/1999 | Takahashi | |
| 6,407,167 B1 | 6/2002 | Shishido et al. | |
| 6,815,496 B2 | 11/2004 | Tasaka et al. | |
| 7,585,916 B2 | 9/2009 | Wright et al. | |
| 2001/0041772 A1 | 11/2001 | Masubuchi et al. | |
| 2002/0132920 A1* | 9/2002 | Willems et al. | 525/88 |
| 2008/0042108 A1 | 2/2008 | Tajima et al. | |
| 2009/0227725 A1 | 9/2009 | Varnhorn et al. | |
| 2010/0047520 A1 | 2/2010 | Drube et al. | |

FOREIGN PATENT DOCUMENTS

| | | |
|---|---|---|
| EP | 0 202 615 A1 | 11/1986 |
| EP | 1 314 749 A2 | 5/2003 |
| JP | 57049639 A | 3/1982 |
| JP | 1007878 A | 1/1998 |
| JP | 10130451 A | 5/1998 |
| JP | 10219076 A | 8/1998 |
| JP | 11286010 A | 10/1999 |
| JP | 2002069274 A | 3/2002 |
| JP | 2005344030 A | 12/2005 |
| JP | 2006036812 A | 2/2006 |
| JP | 20090066379 A | 6/2009 |
| JP | 2009235172 A | 10/2009 |
| JP | 201001363 A | 1/2010 |
| JP | 2010024439 A | 2/2010 |

OTHER PUBLICATIONS

Co-pending U.S. Appl. No, 12/868,369, filed Aug. 25, 2010; Thomas et al.

* cited by examiner

*Primary Examiner* — Terressa Boykin
(74) *Attorney, Agent, or Firm* — William K. McGreevey; Bernard J. Graves, Jr.

(57) ABSTRACT

Copolyester ether elastomer compositions and methods for preparing copolyester ether elastomer compositions. Such compositions can comprise a copolyester ether, a thermoplastic elastomer, and a compatibilizer resin. Improved properties of such compositions can be useful in making various articles of manufacture, such as, for example, laboratory and medical application tubing.

25 Claims, No Drawings

COPOLYESTER ETHER ELASTOMER COMPOSITIONS AND METHODS OF MAKING COPOLYESTER ETHER ELASTOMER COMPOSITIONS

BACKGROUND

1. Field of the Invention

Various embodiments of the present invention relate generally to copolyester ether elastomer compositions and articles prepared therefrom. More particularly, certain embodiments relate to compositions comprising copolyester ethers, styrenic thermoplastic elastomers, and compatibilizer resins.

2. Description of the Related Art

Copolyester ether elastomers, such as ECDEL™ elastomers 9965, 9966, and 9967, and Eastman NEOSTAR™ elastomers FN005, FN006, and FN007, can be extruded or molded into articles that are clear and tough with elastomeric-like properties. However, copolyester ether elastomers have not found wide use in tubing applications due to the material's hardness (which can be around 95 Shore A under ASTM D2240) and tensile modulus (which can be around 170 MPa under ASTM D638). Attempts have been made to modify the length and total content of the polyether segment in order to decrease the material's hardness. Polymers resulting from these modifications, however, do not exhibit the appropriate hardness and tensile modulus for tubing applications. Furthermore, additional polyether content represents a significant increase in resin price.

The most common material employed in medical and laboratory tubing applications is flexible polyvinyl chloride ("PVC"). Flexible PVC contains a dioctyl phthalate plasticizer, which is capable of leaching out into the solutions that pass through the tubing. This is undesirable in applications requiring minimal contaminants, such as in medical and laboratory tubing. Although advancements have been made in medical and laboratory tubing technology, improvements are still desired.

SUMMARY

One embodiment of the invention concerns a composition comprising: (a) a copolyester ether; (b) a thermoplastic elastomer; and (c) a compatibilizer resin, where the copolyester ether comprises dicarboxylic acid monomer residues, where at least 5 percent of the dicarboxylic acid monomer residues are residues of an aliphatic dicarboxylic acid monomer, where the copolyester ether, the thermoplastic elastomer, and the compatibilizer resin are present as a physical mixture in the copolyester ether elastomer composition.

Another embodiment of the invention concerns a process for preparing a copolyester ether elastomer composition. The process of this embodiment comprises admixing a copolyester ether, a thermoplastic elastomer, and a compatibilizer resin, where the copolyester ether comprises dicarboxylic acid monomer residues, where at least 5 percent of the dicarboxylic acid monomer residues are residues of an aliphatic dicarboxylic acid monomer, where the copolyester ether, the thermoplastic elastomer, and the compatibilizer resin remain a physical mixture in the resulting copolyester ether elastomer composition.

Yet another embodiment of the invention concerns an article of manufacture comprising a copolyester ether elastomer composition. The copolyester ether elastomer composition of this embodiment comprises: (a) a copolyester ether comprising a polyether segment primarily comprising residues of an aliphatic diol and an aliphatic dicarboxylic acid and a polyether segment primarily comprising a polyalkylene glycol; (b) a styrene block copolymer; and (c) a hydrocarbon resin, where the copolyester ether, the styrene block copolymer, and the hydrocarbon resin are present as a physical mixture in the copolyester ether elastomer composition.

DETAILED DESCRIPTION

In accordance with various embodiments of the present invention, copolyester ether elastomer compositions are provided comprising a copolyester ether, a thermoplastic elastomer, and a compatibilizer resin. In various embodiments, the copolyester ether elastomer compositions of the present invention can be free or substantially free of certain components, such as plasticizers. The copolyester ether elastomer compositions described herein can be employed in producing various articles of manufacture, such as tubing for medical applications (e.g., catheter tubes, IV tubes) and laboratory use, blood bags, or intravenous ("IV") solution bags.

As noted above, compositions according to various embodiments can comprise a copolyester ether. Copolyester ethers are compounds that may contain at least one polyester segment and at least one polyether segment. Any copolyester ether known or hereafter discovered in the art can be employed in various embodiments described herein.

As noted above, the copolyester ether selected for use can contain at least one polyester segment. In various embodiments, the polyester segment of the copolyester ether can be any polyester containing the residues of a polyol and a polycarboxylic acid or an ester thereof. In one or more embodiments, the polyol can be a diol and the polycarboxylic acid can be a dicarboxylic acid or an ester thereof.

When a dicarboxylic acid is selected for use in the polyester segment, any dicarboxylic acid known or hereafter discovered in the art can be employed, including aromatic and/or aliphatic dicarboxylic acids or esters thereof. In one or more embodiments, at least 5, at least 25, at least 50, at least 75, or at least 99 percent of the dicarboxylic acid monomer residues of the polyester segment are residues of aliphatic dicarboxylic acids or esters thereof. As used herein, the term "aliphatic" shall include any saturated or unsaturated, straight, branched, or cyclic non-aromatic hydrocarbon compounds, and may include heteroatoms. As used herein, the term "heteroatom" shall denote any atom other than carbon and hydrogen. Examples of heteroatoms suitable for use include, but are not limited to, boron, nitrogen, oxygen, sulfur, phosphorus, chlorine, bromine, or iodine. Additionally, in various embodiments, all or substantially all of the polycarboxylic acid residues of the polyester segment can be residues of aliphatic dicarboxylic acids or esters thereof. As used herein, the term "substantially all" shall mean containing less than 10 parts per million by weight ("ppmw") of any component other than the recited component. Suitable aliphatic dicarboxylic acids for use in the polyester segment of the copolyester ether include, but are not limited to, $C_1$ to $C_{20}$, $C_1$ to $C_{12}$, or $C_2$ to $C_8$, saturated or unsaturated, straight, branched, or cyclic dicarboxylic acids or esters thereof. Specific examples of aliphatic dicarboxylic acids include, but are not limited to, oxalic acid, malonic acid, succinic acid, glutaric acid, adipic acid, pimelic acid, suberic acid, azelaic acid, sebacic acid, maleic acid, 1,4-cyclohexanedicarboxylic acid, esters thereof, and homologues thereof. In one or more embodiments, the polycarboxylic acid component of the polyester segment can comprise the residues of 1,4-cyclohexanedicarboxylic acid or esters thereof, such as dimethyl cyclohexane-1,4-dicarboxylate or diethyl cyclohexane-1,4-dicarboxylate. In various embodiments, all or substantially all of the polycarboxylic acid component of the polyester segment can be residues of 1,4-cyclohexane dicarboxylic acid. In other various embodiments, all or substantially all of the polycarboxylic acid component of the polyester segment can be dimethyl cyclohexane-1,4-dicarboxylate.

As noted above, the polyol of the polyester segment of the copolyester ether can be a diol. When a diol is selected for use in the polyester segment, any diol known or hereafter discovered in the art can be employed, including aromatic and/or aliphatic diols. In one or more embodiments, at least 5, at least 25, at least 50, at least 75, or at least 99 percent of the diol monomer residues of the polyester segment are residues of aliphatic diols. Additionally, in various embodiments, all or substantially all of the polyol residues of the polyester segment can be residues of an aliphatic diol. Suitable aliphatic diols for use in the polyester segment of the copolyester ether include, but are not limited to, $C_1$ to $C_{20}$, $C_1$ to $C_{12}$, or $C_2$ to $C_8$, saturated or unsaturated, straight, branched, or cyclic diols. In one or more embodiments, the polyester segment can comprise the residues of 1,4-cyclohexanediol. In various embodiments, all or substantially all of the polyol component of the polyester segment can be residues of 1,4-cyclohexanediol.

In one or more embodiments, the polyester segment of the copolyester ether can primarily comprise monomer residues of an aliphatic diol and an aliphatic dicarboxylic acid, such as those described above. As used herein, the term "primarily" shall mean greater than 50 percent. In other embodiments, the polyester segment of the copolyester ether can completely or substantially completely be comprised of the monomer residues of an aliphatic diol and an aliphatic dicarboxylic acid or an ester thereof. Although aliphatic components are primarily described above, it is contemplated that aromatic compounds, such as terephthalic acid, isophthalic acid, esters thereof, and the like can be employed as components in the polyester segment of the copolyester ether.

As noted above, the copolyester ether selected for use can contain at least one polyether segment. Any polyether known or hereafter discovered in the art can be employed as the polyether segment. In various embodiments, the polyether segment of the copolyester ether can comprise a polyalkylene glycol. For example, in one or more embodiments, the polyether segment can comprise polyethylene glycol, polypropylene glycol, polytetramethylene glycol, or mixtures of two or more thereof. In one or more embodiments, at least 5, at least 25, at least 50, at least 75, or at least 99 percent of the polyether segment is a polyalkylene glycol. Additionally, the polyether segment can primarily comprise a polyalkylene glycol. In one or more embodiments, all or substantially all of the polyether segment is a polyalkylene glycol. In various embodiments, the polyether segment of the copolyester ether can have a molecular weight in the range of from about 50 to about 10,000 g/mol, in the range of from about 200 to about 7,500 g/mol, or in the range of from about 400 to about 5,000 g/mol.

In one or more embodiments, the polyester segment of the copolyester ether selected for use can constitute in the range of from about 70 to about 90 weight percent, in the range of form about 75 to about 85 weight percent, or about 80 weight percent of the copolyester ether. Additionally, the polyether segment of the copolyester ether selected for use can constitute in the range of from about 10 to about 30, in the range of from about 15 to about 25, or about 20 weight percent of the copolyester ether.

In addition to the polyester and polyether components, copolyester ethers according to various embodiments can also include one or more branching agents. In various embodiments, the copolyester ether can comprise in the range of from about 0.1 to about 2 mole percent of a branching agent. Any conventional branching agent can be employed in various embodiments described herein. For example, trimellitic anhydride, trimellitic acid, pyromellitic dianhydride, glycerol, trimethylolpropane, and/or pentaerythritol can be employed as a branching agent.

In various embodiments, the copolyester ether selected for use can have an inherent viscosity of at least 0.6, at least 0.7, or at least 0.8. Additionally, the copolyester ether selected for use can have an inherent viscosity of less than 1.5, less than 1.4, or less than 1.3. Furthermore, the copolyester ether selected for use can have an inherent viscosity in the range of from about 0.6 to about 1.5, in the range of from about 0.7 to about 1.4, or in the range of from 0.8 to 1.3. Inherent viscosity is determined as measured in a 60/40 (wt/wt) mixture of phenol/tetrachloroethane using 0.5 grams of the copolyester ether in 100 mL of solvent at 25° C.

Copolyester ethers useful in various embodiments of the present invention can be prepared by any known or hereafter discovered methods in the art. In one or more embodiments, the copolyester ether can be prepared via melt phase polycondensation of the polyol and polycarboxylic acid components.

Examples of commercially available copolyester ethers suitable for use in various embodiments of the present invention include, but are not limited to, ECDEL™ elastomers produced by Eastman Chemical Company, such as ECDEL™ 9965, ECDEL™ 9966, and ECDEL™ 9967; and NEOSTAR™ elastomers, such as NEOSTAR™ FN005, NEOSTAR™ FN006, and NEOSTAR™ FN007.

As noted above, the copolyester ether elastomer compositions according to various embodiments of the present invention can comprise a thermoplastic elastomer. Any thermoplastic elastomer known or hereafter discovered in the art can be employed in the various embodiments described herein. In one or more embodiments, the thermoplastic elastomer can be compatible with the copolyester ether selected for use in the copolyester ether elastomer compound. Additionally, the thermoplastic elastomer selected for use can have a Shore A hardness in the range of from about 35 to about 55, or in the range of from 40 to 50. Furthermore, in various embodiments, the thermoplastic elastomer can have a low enough molecular weight so as to enable its processability. In various embodiments the thermoplastic elastomer can have a number average molecular weight of less than 500,000, less than 400,000, or less than 300,000. Additionally, the thermoplastic elastomer can have a number average molecular weight in the range of from about 50,000 to about 300,000. Also, the thermoplastic elastomer chosen for use can be thermally stable, having a degradation temperature of at least 190° C., in the range of from about 195° C. to about 250° C., or in the range of from 210 to 240° C.

In one or more embodiments, the thermoplastic elastomer can comprise a styrene block copolymer and/or an ethylene vinyl acetate copolymer. In various embodiments, at least 50 weight percent, at least 75 weight percent, or at least 99 weight percent of the thermoplastic elastomer can be a styrene block copolymer. In other embodiments, all or substantially all of the thermoplastic elastomer can be a styrene block copolymer. Additionally, in other various embodiments, the thermoplastic elastomer can also comprise a modified block copolymer containing polycarboxyl functional groups, such as, for example, cyclic anhydrides.

Styrene block copolymers suitable for use herein can be any known or hereafter discovered styrene block copolymers. In various embodiments, the styrene block copolymer can have an A-B-A configuration, where A is a styrene polymer block and B is one or more conjugated diene polymer blocks or hydrogenated conjugated diene polymer blocks. Examples of suitable styrene block copolymers include, but are not limited to, styrene-isoprene-styrene, styrene-butadiene-styrene, styrene-ethylene-propylene-styrene, styrene-ethylene-butylene-styrene, styrene-vinylisoprene-isoprene-styrene, hydrogenated derivatives thereof, and mixtures of two or more thereof. Examples of suitable commercially-available styrene block copolymers include, but are not limited to, styrene block copolymers produced by Kraton Performance Polymers, such as KRATON® 6945, 1924X, G1643 M, and 6670; SIBSTAR® 102T (Kaneka Texas Corporation, Pasadena, Tex., USA); and HYBRAR™ 7311 (Kuraray America, Inc., Pasadena, Tex., USA).

As noted above, the copolyester ether elastomer compositions according to various embodiments of the present invention can comprise a compatibilizer resin. In various embodiments, the compatibilizer resin can act to increase the interfacial interaction between the above-described copolyester ether and thermoplastic elastomer. Any compatibilizer resin known or hereafter discovered in the art can be employed in the various embodiments described herein. In one or more embodiments, the compatibilizer resin is non-reactive with respect to the copolyester ether and the thermoplastic elastomer. As used herein, the term "non-reactive" shall mean that the compatibilizer does not form a new molecular structure via covalent bonding when combined with the copolyester ether and/or the thermoplastic elastomer at standard temperature and pressure according to the National Institute of Standards and Technology (i.e., 20° C., 1 atm). Additionally, in various embodiments, the compatibilizer resin employed can be free or substantially free of reactive functional groups. As used herein, the term "substantially free" shall denote a content of less than 10 ppmw. Reactive functional groups include, for example, epoxy groups, carboxylic acid groups, hydroxyl groups, and the like.

In one or more embodiments, the compatibilizer resin is a hydrocarbon resin and/or a hydrogenated hydrocarbon resin. Hydrocarbon resins suitable for use can have an aliphatic structure, an aromatic structure, or a mixed aliphatic/aromatic structure. Examples of other types of compatibilizer resins suitable for use in various embodiments include, but are not limited to, terpene resins, rosin esters, ester amide resins, low molecular weight polyester resins, and mixtures of two or more thereof. As used herein, the term "low molecular weight" when used to describe a polyester resin shall denote a number average molecular weight in the range of from about 2,000 to about 5,000. In various embodiments, at least 50 weight percent, at least 75 weight percent, or at least 99 weight percent of the compatibilizer resin can be a hydrocarbon resin and/or a hydrogenated hydrocarbon resin. In other embodiments, all or substantially all of the compatibilizer resin can be a hydrocarbon resin and/or a hydrogenated hydrocarbon resin. Examples of suitable commercially-available hydrocarbon resins include, but are not limited to, REGALITE™ hydrocarbon resins, such as REGALITE™ 1124, and KRISTALEX™ hydrocarbon resins, such as KRISTALEX™ 3100, both produced by Eastman Chemical Company.

In various embodiments, the copolyester ether elastomer compositions can comprise the above-described copolyester ether in an amount in the range of from about 20 to about 98 weight percent, or in the range of from 55 to 80 weight percent based on the entire weight of the copolyester ether elastomer composition. Additionally, the copolyester ether elastomer composition can comprise the above-described thermoplastic elastomer in an amount in the range of from about 1 to about 80 weight percent, or in the range of from 15 to 25 weight percent based on the entire weight of the copolyester ether elastomer composition. Furthermore, the copolyester ether elastomer compositions can comprise the above-described compatibilizer resin in an amount in the range of from about 1 to about 10 weight percent, or in the range of from 2 to 10 weight percent based on the entire weight of the copolyester ether elastomer composition.

In one or more embodiments, the copolyester ether elastomer compositions can comprise the above-described copolyester ether, thermoplastic elastomer, and compatibilizer resin in a combined amount of at least 50 weight percent, at least 75 weight percent, or at least 99 weight percent based on the entire weight of the copolyester ether elastomer. Additionally, in various embodiments, the copolyester ether, thermoplastic elastomer, and compatibilizer can constitute all or substantially all of the copolyester ether elastomer composition.

It is contemplated in various embodiments that the copolyester ether elastomer composition can contain other select components. Additional components that may be present in the copolyester ether elastomer composition include, but are not limited to, antioxidants, stabilizers, and/or colorants. Such additional components can be present in minor amounts. In various embodiments, the copolyester ether elastomer composition comprises less than 10, less than 5, or less than 1 weight percent each of antioxidants, stabilizers, and colorants.

In various embodiments, the copolyester ether elastomer compositions described herein can be in the form of a physical mixture. In other words, in various embodiments, the copolyester ether, the thermoplastic elastomer, and the compatibilizer resin do not chemically interact when combined and processed, such as described below. However, it should be noted that the term "physical mixture" does not exclude intermolecular interactions between the copolyester ether, the thermoplastic elastomer, and the compatibilizer resin, such as hydrogen bonding and dipole-dipole interactions, for example.

In one or more embodiments, the copolyester ether elastomer composition can comprise plasticizers, such as phthalate plasticizers (e.g., dioctyl phthalate), in an amount of less than 10, less than 5, or less than 1 weight percent based on the entire weight of the copolyester ether elastomer composition. Additionally, in various embodiments, the copolyester ether elastomer composition can be free or substantially free of plasticizers.

In one or more embodiments, the copolyester ether elastomer composition can comprise oils having a molecular weight of less than 1,000 g/mol in an amount of less than 10, less than 5, or less than 1 weight percent based on the entire weight of the copolyester ether elastomer composition. Additionally, in various embodiments, the copolyester ether elastomer composition can be free or substantially free of oils having a molecular weight of less than 1,000 g/mol.

In one or more embodiments, the copolyester ether elastomer composition can comprise polyvinyl chloride ("PVC") in an amount of less than 10, less than 5, or less than 1 weight percent based on the entire weight of the copolyester ether elastomer composition. Additionally, in various embodiments, the copolyester ether elastomer composition can be free or substantially free of PVC.

In one or more embodiments, the copolyester ether elastomer composition can comprise polycarbonates in an amount of less than 10, less than 5, or less than 1 weight percent based on the entire weight of the copolyester ether elastomer composition. Additionally, in various embodiments, the copolyester ether elastomer composition can be free or substantially free of polycarbonates.

In one or more embodiments, the copolyester ether elastomer composition can comprise barium sulfate in an amount of less than 10, less than 5, or less than 1 weight percent based on the entire weight of the copolyester ether elastomer composition. Additionally, in various embodiments, the copolyester ether elastomer composition can be free or substantially free of barium sulfate.

In one or more embodiments, the copolyester ether elastomer composition can comprise ethylene-acrylate ester-maleic anhydride copolymers in an amount of less than 10, less than 5, or less than 1 weight percent based on the entire weight of the copolyester ether elastomer composition. Additionally, in various embodiments, the copolyester ether elastomer composition can be free or substantially free of ethylene-acrylate ester-maleic anhydride copolymers.

In one or more embodiments, the copolyester ether elastomer composition can comprise fiberglass in an amount of less than 10, less than 5, or less than 1 weight percent based on the entire weight of the copolyester ether elastomer composition. Additionally, in various embodiments, the copolyester ether elastomer composition can be free or substantially free of fiberglass.

In one or more embodiments, the copolyester ether elastomer composition can comprise epoxy-containing compounds in an amount of less than 10, less than 5, or less than 1 weight percent based on the entire weight of the copolyester ether elastomer composition. Additionally, in various embodiments, the copolyester ether elastomer composition can be free or substantially free of epoxy-containing compounds.

In one or more embodiments, the copolyester ether elastomer composition can comprise polyamides in an amount of less than 10, less than 5, or less than 1 weight percent based on the entire weight of the copolyester ether elastomer composition. Additionally, in various embodiments, the copolyester ether elastomer composition can be free or substantially free of polyamides.

In one or more embodiments, the copolyester ether elastomer composition can comprise polyacrylates in an amount of less than 10, less than 5, or less than 1 weight percent based on the entire weight of the copolyester ether elastomer composition. Additionally, in various embodiments, the copolyester ether elastomer composition can be free or substantially free of polyacrylates.

In one or more embodiments, the copolyester ether elastomer composition can comprise lactic acid polymers in an amount of less than 10, less than 5, or less than 1 weight percent based on the entire weight of the copolyester ether elastomer composition. Additionally, in various embodiments, the copolyester ether elastomer composition can be free or substantially free of lactic acid polymers.

In one or more embodiments, the copolyester ether elastomer composition can comprise cross-linking agents in an amount of less than 10, less than 5, or less than 1 weight percent based on the entire weight of the copolyester ether elastomer composition. As used herein, the term "cross-linking agent" shall denote any substance that facilitates, promotes, or regulates intermolecular covalent bonding between polymer chains. Additionally, in various embodiments, the copolyester ether elastomer composition can be free or substantially free of cross-linking agents.

In one or more embodiments, the copolyester ether elastomer composition can comprise flame retardants in an amount of less than 10, less than 5, or less than 1 weight percent based on the entire weight of the copolyester ether elastomer composition. Additionally, in various embodiments, the copolyester ether elastomer composition can be free or substantially free of flame retardants.

In various embodiments, the above-described copolyester ether elastomer composition can have a variety of properties making it suitable for use in certain applications. For instance, in one or more embodiments, the copolyester ether elastomer composition can be solvent bondable to a PVC and/or a polycarbonate substrate. As known in the art, "solvent bonding" is a process in which the surfaces of parts to be joined are treated with a solvent. This treatment swells and softens the surfaces and, by applying pressure to the joint and with the evaporation of the solvent, the two surfaces bond. Adhesives are not employed. For example, when the copolyester ether elastomer composition is employed to make medical application tubing (as described below), the tubing can be solvent bound to the polycarbonate or PVC luer of a syringe, using, for example, a cyclohexanone solvent.

In one or more embodiments, the copolyester ether elastomer composition can be able to withstand sterilization via any of steam (autoclaving), gamma, or EtO sterilization techniques. In various embodiments, the copolyester ether elastomer composition can have a softening point of at least 144, at least 160, or at least 170° C. Softening point is determined by dynamic mechanical thermal analysis ("DMA") on samples having dimensions of 10.2 cm×10.2 cm×0.2 cm and using a temperature range from −100 to 300° C. Additionally, the copolyester ether elastomer composition can have a tensile strength in the range of from about 10 to about 20 MPa, or in the range of from 10 to 15 MPa. Furthermore, the copolyester ether elastomer composition can have a Shore A hardness in the range of from about 60 to about 90, or in the range of from 65 to 85. Moreover, the copolyester ether elastomer composition can have a Shore D hardness in the range of from about 25 to about 45, or in the range of from 30 to 40. Also, the copolyester ether elastomer composition can have a Young's modulus in the range of from about 0.5 to about 5 MPa, in the range of from about 2 to about 4 MPa, or in the range of from 2.5 to 3.5 MPa. All tensile properties are determined according to ASTM D638.

In various embodiments, the copolyester ether elastomer composition can have a tensile modulus at 50% in the range of from about 4 to about 6 MPa. Also, the copolyester ether elastomer composition can have a tensile modulus at 100% in the range of from about 4.5 to about 6.5 MPa. Additionally, the copolyester ether elastomer composition can have a tensile modulus at 200% in the range of from about 4.5 to about 6.5 MPa. Furthermore, the copolyester ether elastomer composition can have a tensile modulus at 300% in the range of from about 5 to about 7 MPa.

In one or more embodiments, the copolyester ether elastomer composition can have a tear strength in the range of from about 65 to about 85 kN/m. Also, the copolyester ether elastomer composition can have an elongation at break in the range of from about 900 to about 1,300 percent, or in the range of from 1,000 to 1,200 percent. Additionally, the copolyester ether elastomer composition can have an elongation at yield in the range of from about 70 to about 100 percent.

In various embodiments, the copolyester ether elastomer composition can have a clarity of at least 25, at least 40, at least 45, or at least 50. Additionally, in various embodiments, the copolyester ether elastomer composition can have a percent transmittance of at least 70, at least 80, at least 85, or at least 90 percent. Clarity and transmittance are determined employing standard techniques on a BYK Gardner Haze- Gard Plus. Additionally, clarity and transmittance values are determined employing sample specimens having dimensions of 10.2 cm×10.2 cm×0.2 cm.

The copolyester ether elastomer compositions described above can be prepared by any known or hereafter discovered methods in the art. In various embodiments, the copolyester ether, thermoplastic elastomer, and the compatibilizer resin can be dry blended using any blending techniques known in the art. The resulting mixture can be added and compounded in an extruder, such as a co-rotating twin screw extruder. The processing temperature of the extruder can range from about 180 to about 240° C., or from about 190 to about 230° C. Following extrusion, strands of the copolyester ether elastomer composition can be cooled in a water bath. Thereafter, the copolyester ether elastomer composition can be pelletized so that the composition may be employed in various manufacturing techniques, such as, for example, injection molding.

The copolyester ether elastomer compositions described herein are suitable for use in making a variety of articles of manufacture. Particularly, the copolyester ether elastomer compositions described herein may find use in preparing medical application articles, such as laboratory tubing, medical application tubing, blood bags, IV solution bags, and the like.

Accordingly, in various embodiments, the copolyester ether elastomer compositions can be employed in preparing a tube, where at least one layer of the tube comprises the copolyester ether elastomer composition described herein. In one or more embodiments, a tube can be prepared that consists essentially of the above-described copolyester ether elastomer composition. In other various embodiments, a tube can be prepared having at least one layer that consists essentially of the above-described copolyester ether elastomer composition.

Tubes comprising copolyester ether elastomer compositions can be prepared according to any methods known or hereafter discovered in the art. For example, in various embodiments, a tube can be prepared by extruding the above-described copolyester ether elastomer composition in a tube shape having the desired dimensions through a water bath with the aid of a puller. The water bath employed can be a multi-stage water bath having subsequently decreasing temperatures. The extrusion temperature employed for preparing extruded tubes can be in the range of from about 200 to about 260° C.

In one or more embodiments, the tubing can be a multi-layer tube comprising multiple substantially concentric layers. When multi-layer tubes are formed, in various embodiments, the outer-most layer can comprise the above-described copolyester ether elastomer composition. In one or more embodiments, the inner-most layer can comprise a low-density polyethylene or a thermoplastic polyurethane. In other various embodiments, the tube can be a three-layer tube, with the inner-most layer comprising a low-density polyethylene, and the intermediate layer comprising an ethylene vinyl acetate polymer. Multi-layer tubes according to various embodiments can be prepared by coextrusion of the desired compositions in layers.

Tubes prepared according to the various embodiments described herein can have any desired dimensions. In various embodiments, tubes prepared using the above-described copolyester ether elastomer composition can have an average outer diameter in the range of from about 0.6 to about 60 mm, or in the range of from 1 to 50 mm. Additionally, tubes prepared using the copolyester ether elastomer composition described herein can have an average wall thickness in the range of from about 0.025 to about 2.5 mm.

In various embodiments, tubes prepared as described above can have a stress at break of at least 10, at least 13, at least 15, at least 17, or at least 19 MPa. Additionally, the tubes can have a stress at 100% strain of at least 7, at least 7.5, or at least 8 Mpa. Furthermore, the tubes can have a strain at break of at least 800, at least 850, or at least 900 percent.

In one or more embodiments, the tubes prepared as described above can be employed to transport a fluid by flowing a fluid through the tube. In various embodiments, the fluid can be a biological fluid (such as, for example, blood or urine) or the fluid can comprise a medicament (such as when being used in intravenous therapy).

This invention can be further illustrated by the following examples of embodiments thereof, although it will be understood that these examples are included merely for the purposes of illustration and are not intended to limit the scope of the invention unless otherwise specifically indicated.

EXAMPLES

Test Methods

In each of the following Examples, clarity and transmittance were determined employing standard techniques on a BYK Gardner Haze-Gard Plus on plaques of sample specimens having dimensions of 10.2 cm×10.2 cm×0.2 cm. Additionally, all tensile properties were determined according to ASTM D638 on plaques of sample specimens having dimensions of 10.2 cm×10.2 cm×0.2 cm. Furthermore, Shore durometer was determined according to ASTM D2240 on plaques of samples having dimensions of 7.6 cm×7.6 cm×0.3 cm.

Example 1

Blends of COPE and SEBS (KRATON® 6945)

Four samples (Sample Nos. 1-4) containing ECDEL™ Elastomer 9966 (copolyester ether elastomer ("COPE"); Eastman Chemical Company, Kingsport, Tenn., USA) and KRATON® 6945 (styrene-ethylene-butylene-styrene block copolymer ("SEBS"); Kraton Performance Polymers, Inc., Houston, Tex., USA) were dry blended according to the part ratio listed in Table 1, below, and dried at 56° C. for 4 hours. The dry blend was compounded using a Werner & Pfleiderer WP-30A 30-mm co-rotating twin screw extruder at 450 rpm. The different zone temperatures ranged from 190 to 230° C. Strands of the resulting samples were cooled in an ambient temperature water bath and pelletized. The resulting granules were further injection molded into plaques having dimensions as described above for physical and mechanical testing. The properties of the molded articles are listed in Table 1, below.

TABLE 1

Composition and Properties of Samples 1-4

| | Sample No.: | | | |
|---|---|---|---|---|
| | 1 | 2 | 3 | 4 |
| Ecdel 9966 (wt. %) | 70 | 50 | 30 | — |
| Kraton ® 6945 (wt. %) | 30 | 50 | 70 | 100 |
| Tear Strength (kN/m): | 84.8 | 63.7 | 43.3 | 14.5 |
| Tensile Properties | | | | |
| Tensile Modulus 50% (MPa): | 5.8 | 4.0 | 2.2 | 0.5 |
| Tensile Modulus 100% (MPa): | 6.1 | 4.3 | 2.6 | 0.7 |

TABLE 1-continued

Composition and Properties of Samples 1-4

| | Sample No.: | | | |
|---|---|---|---|---|
| | 1 | 2 | 3 | 4 |
| Tensile Modulus 200% (MPa): | 8.2 | 5.8 | 3.5 | 1.0 |
| Tensile Modulus 300% (MPa): | 11.1 | 7.8 | 4.7 | 1.4 |
| Tensile Strength (MPa): | 15.0 | 12.3 | 10.2 | 6.7 |
| Elongation at Break (%): | 443 | 551 | 748 | 740 |
| Elongation at Yield (%): | 23 | 36 | 34 | 469 |
| Young's modulus: | 10.2 | 4.9 | 0.71 | 0.27 |
| Shore Durometer | | | | |
| Shore A: | 90 | 80 | 65 | 45 |
| Shore D: | 35 | 25 | 15 | 5 |

As can be seen from the data provided above in Table 1, the addition of KRATON® 6945 effectively lowered the Shore A hardness, tensile strength, tensile modulus, and Young's modulus of the copolyester ether. Additionally, Elongation at break was increased. The contact clarity (data not provided) was not adequate for these blends. Thus, increasing the content of the thermoplastic elastomer resulted in a compound deficient in tensile properties.

Example 2

Blends of COPE and SEPS (KRATON® G1643 M)

Four samples (Sample Nos. 5-8) containing ECDEL™ Elastomer 9966 and KRATON® G1643 M (styrene-ethylene-propylene-styrene block copolymer ("SEPS"); Kraton Performance Polymers, Inc., Houston, Tex., USA) were dry blended according to the part ratio listed in Table 2, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water bath and pelletized. The resulting granules obtained from extrusion were further injection molded into plaques having dimensions as described above for physical and mechanical testing. The properties of the molded articles are listed in Table 2, below.

TABLE 2

Composition and Properties of Samples 5-8

| | Sample No.: | | | |
|---|---|---|---|---|
| | 5 | 6 | 7 | 8 |
| Ecdel 9966 (wt. %) | 70 | 50 | 30 | — |
| Kraton ® G1643 M (wt. %) | 30 | 50 | 70 | 100 |
| Tear Strength (kN/m): | 85.3 | 57.3 | 43.8 | 24.0 |
| Tensile Properties | | | | |
| Tensile Modulus 50% (MPa): | 6.0 | 4.1 | 2.2 | 0.7 |
| Tensile Modulus 100% (MPa): | 6.4 | 4.6 | 2.9 | 0.9 |
| Tensile Modulus 200% (MPa): | 8.3 | 6.0 | 4.1 | 1.4 |
| Tensile Modulus 300% (MPa): | 11.1 | 7.9 | 5.4 | 2.0 |
| Tensile Strength (MPa): | 13.2 | 10.9 | 9.1 | 12.9 |
| Elongation at Break (%): | 392 | 488 | 589 | 842 |
| Elongation at Yield (%): | 29 | 45 | 40 | 51 |
| Young's modulus: | 9.5 | 3.8 | 0.96 | 0.47 |
| Shore Durometer | | | | |
| Shore A: | 90 | 75 | 63 | 50 |
| Shore D: | 35 | 25 | 15 | 10 |

As can be seen from the data provided in Table 2, the addition of KRATON® G1643 M effectively lowered the Shore A hardness, tensile strength, tensile modulus, and Young's modulus of the copolyester ether. Elongation at break was increased. The contact clarity (data not provided) was not adequate for these blends. Increasing the content of the thermoplastic elastomer resulted in a compound deficient in tensile strength.

Example 3

Blends of COPE and SEBS (KRATON® 1924X)

Four samples (Sample Nos. 9-12) containing ECDEL™ Elastomer 9966 and KRATON® 1924X (SEBS; Kraton Performance Polymers, Inc., Houston, Tex., USA) were dry blended according to the part ratio listed in Table 3, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water bath and pelletized. The resulting granules obtained from extrusion were further injection molded into plaques having dimensions as described above for physical and mechanical testing. The properties of the molded articles are listed in Table 3, below.

TABLE 3

Composition and Properties of Samples 9-12

| | Sample No.: | | | |
|---|---|---|---|---|
| | 9 | 10 | 11 | 12 |
| Ecdel 9966 (wt. %) | 70 | 50 | 30 | — |
| Kratoe ® 1924X (wt. %) | 30 | 50 | 70 | 100 |
| Tear Strength (kN/m) | 77.8 | 70.1 | 43.6 | 29.6 |
| Tensile Properties | | | | |
| Tensile Modulus 50% (MPa): | 6.1 | 4.4 | 2.3 | 1.0 |
| Tensile Modulus 100% (MPa): | 6.5 | 4.8 | 2.7 | 1.2 |
| Tensile Modulus 200% (MPa): | 8.3 | 6.0 | 3.6 | 1.5 |
| Tensile Modulus 300% (MPa): | 10.8 | 7.6 | 4.4 | 2.0 |
| Tensile Strength (MPa): | 12.9 | 8.7 | 5.1 | 7.8 |
| Elongation at Break (%): | 398 | 390 | 480 | 915 |
| Elongation at Yield (%): | 25 | 40 | 50 | 78 |
| Young's modulus: | 10.6 | 5.8 | 1.6 | 0.18 |
| Shore Durometer | | | | |
| Shore A: | 90 | 80 | 65 | 50 |
| Shore D: | 37 | 25 | 17 | 10 |

As can be seen from the data provided in Table 3, the addition of KRATON® 1924X effectively lowered the Shore A hardness, tensile strength, tensile modulus, and Young's modulus of the copolyester ether. Elongation at break was increased. The contact clarity (data not provided) was not adequate for these blends. Increasing the content of the thermoplastic elastomer resulted in a compound deficient in tensile strength.

Example 4

Blends of COPE and SEBS (KRATON® 6670)

Four samples (Sample Nos. 13-16) containing ECDEL™ Elastomer 9966 and KRATON® 6670 (SEBS; Kraton Performance Polymers, Inc., Houston, Tex., USA) were dry blended according to the part ratio listed in Table 4, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water-bath and pelletized. The resulting granules obtained from extrusion were further injection molded into plaques having dimensions as described above for physical and mechanical testing. The properties of the molded articles are listed in Table 4, below.

TABLE 4

Composition and Properties of Sample Nos. 13-16

| | Sample No.: | | | |
|---|---|---|---|---|
| | 13 | 14 | 15 | 16 |
| Ecdel 9966 (wt. %) | 70 | 50 | 30 | — |
| Kraton ® 6670 (wt. %) | 30 | 50 | 70 | 100 |
| Tear Strength (kN/m): | 84.4 | 77.2 | 61.8 | 35.6 |
| Tensile Properties | | | | |
| Tensile Modulus 50% (MPa): | 6.7 | 5.2 | 3.5 | 1.5 |
| Tensile Modulus 100% (MPa): | 7.1 | 5.6 | 3.9 | 1.7 |
| Tensile Modulus 200% (MPa): | 9.1 | 7.4 | 5.2 | 2.4 |
| Tensile Modulus 300% (MPa): | 12.1 | 9.8 | 7.1 | 3.2 |
| Tensile Strength (MPa): | 20.3 | 19.6 | 19.5 | 11.8 |
| Elongation at Break (%): | 542 | 595 | 716 | 721 |
| Elongation at Yield (%): | 23 | 39 | 39 | 57 |
| Young's modulus: | 10.6 | 5.7 | 0.79 | 0.49 |
| Shore Durometer | | | | |
| Shore A: | 92 | 90 | 80 | 70 |
| Shore D: | 40 | 35 | 27 | 20 |

As can be seen from the data provided in Table 4, the addition of KRATON® 6670 effectively lowered the Shore A hardness, tensile strength, tensile modulus, and Young's modulus of the copolyester ether. Elongation at break was increased. The contact clarity (data not provided) was not adequate for these blends. Increasing the content of the thermoplastic elastomer resulted in a compound with good tensile strength but poor kink resistance as evidenced by the Young's modulus.

Example 5

Blends of COPE, Styrene Copolymers (KRATON® G1643M or 6945), and Hydrocarbon Resin Nine samples (Sample Nos. 17-25) containing ECDEL™ Elastomer 9966, KRATON® G1643M (SEPS) or KRATON® 6945 (SEBS), and REGALITE™ R1125 (hydrogenated hydrocarbon resin; Eastman Chemical Company, Kingsport, Tenn., USA) or KRISTALEX™ 3100 (hydrocarbon resin; Eastman Chemical Company, Kingsport, Tenn., USA) were dry blended according to the part ratio listed in Table 5, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water bath and pelletized. The resulting granules obtained from extrusion were further injection molded into plaques having dimensions as described above for physical and mechanical testing. The properties of the molded articles are listed in Table 5, below.

TABLE 5

Composition and Properties of Samples Nos. 17-25

| Sample No.: | 17 | 18 | 19 | 20 | 21 | 22 | 23 | 24 | 25 |
|---|---|---|---|---|---|---|---|---|---|
| Ecdel 9966 (wt. %) | 50 | 50 | 50 | 50 | 70 | 70 | 65 | 65 | 65 |
| Kraton ® G1643 M (wt. %) | — | — | 50 | 50 | 27 | 27 | 32 | 32 | 35 |
| Kraton ® 6945 (wt. %) | 50 | 50 | — | — | — | — | — | — | — |
| Regalite ™ R1125 | — | 5* | — | 5* | — | 3^ | — | 3^ | — |
| Kristalex ™ 3100 | 5* | — | 5* | — | 3^ | — | 3^ | — | — |
| Tear Strength (kN/m): | 60.1 | 63.9 | 67.9 | 60.6 | 84.3 | 76.8 | 81.4 | 77.9 | 68.9 |
| Tensile Properties | | | | | | | | | |
| Tensile Modulus 50% (MPa): | 3.4 | 3.1 | 3.5 | 3.1 | 5.5 | 5.3 | 5.3 | 5.3 | 5.0 |
| Tensile Modulus 100% (MPa): | 3.7 | 3.4 | 3.9 | 3.7 | 5.6 | 5.6 | 5.4 | 5.6 | 5.3 |
| Tensile Modulus 200% (MPa): | 3.9 | 3.6 | 4.2 | 4.2 | 5.6 | 5.7 | 5.5 | 5.6 | 5.4 |
| Tensile Modulus 300% (MPa): | 4.2 | 4.0 | 4.6 | 4.6 | 6.0 | 6.1 | 5.9 | 6.0 | 5.8 |
| Tensile Strength (MPa): | 14.0 | 13.3 | 13.9 | 11.8 | 15.9 | 15.4 | 15.5 | 14.4 | 13.5 |
| Elongation at Break (%): | 1339 | 1549 | 1324 | 1278 | 1136 | 1120 | 1136 | 1106 | 1146 |
| Elongation at Yield (%): | 95 | 116 | 117 | 130 | 78 | 88 | 74 | 91 | 91 |
| Young's modulus: | 1.6 | 1.45 | 1.47 | 1.306 | 3.284 | 3.047 | 3.23 | 3.009 | 2.879 |
| Shore Durometer | | | | | | | | | |
| Shore A: | 80 | 78 | 78 | 70 | 85 | 87 | 87 | 87 | 85 |
| Shore D: | 25 | 23 | 25 | 20 | 35 | 35 | 35 | 35 | 32 |
| Clarity | | | | | | | | | |
| | 24.9 | 32.8 | 43.3 | 88.3 | 38.8 | 51 | 28.7 | 34.6 | 32.6 |
| | 23 | 33.8 | 46.6 | 83.6 | 42.8 | 52 | 27 | 38 | 39.9 |
| | 22.8 | 32.8 | 42.6 | 83.5 | 43.4 | 51.3 | 24.7 | 38.5 | — |
| | 23.6 | 33.1 | 44.2 | 85.1 | 41.7 | 51.4 | 26.8 | 37.0 | 36.3 |
| Transmittance (%) | | | | | | | | | |
| | 87.8 | 88.3 | 88.5 | 90.8 | 89.6 | 91.4 | 91.3 | 91.6 | 91.6 |
| | 86.6 | 89.2 | 88.4 | 91.2 | 91.2 | 91.6 | 89.6 | 91.7 | 91.4 |

TABLE 5-continued

Composition and Properties of Samples Nos. 17-25

| Sample No.: | 17 | 18 | 19 | 20 | 21 | 22 | 23 | 24 | 25 |
|---|---|---|---|---|---|---|---|---|---|
| | 86.6 | 88.7 | 88.3 | 90.4 | 92.3 | 92.1 | 89.9 | 91.7 | — |
| | 87.0 | 88.7 | 88.4 | 90.8 | 91.0 | 91.7 | 90.3 | 91.7 | 91.5 |

*Parts per hundred ("phr") copolyester ether and thermoplastic elastomer.

^Weight percent.

The combination of either KRATON® G1643 M or 6945 with both a compatibilizer (REGALITE™ R1125 or KRISTALEX™ 3100) and copolyester ether resulted in an appropriate balance of tensile properties, flexibility, and optical properties that was not achieved in the absence of the compatibilizer.

Example 6

Blends of COPE, Styrene Copolymers (KRATON® 1924X or 6670), and Hydrocarbon Resin Four samples (Sample Nos. 26-29) containing ECDEL™ Elastomer 9966, KRATON® 1924X (SEBS) or KRATON® 6670 (SEBS), and REGALITE™ R1125 or KRISTALEX™ 3100 were dry blended according to the part ratio listed in Table 6, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water bath and pelletized. The resulting granules obtained from extrusion were further injection molded into plaques having dimensions as described above for physical and mechanical testing. The properties of the molded articles are listed in Table 6, below.

TABLE 6

Composition and Properties of Sample Nos. 26-29

| | Sample No.: | | | |
|---|---|---|---|---|
| | 26 | 27 | 28 | 29 |
| Ecdel 9966 (wt. %) | 50 | 50 | 50 | 50 |
| Kraton ® 1924X (wt. %) | 50 | 50 | — | — |
| Kraton ® 6670 (wt. %) | — | — | 50 | 50 |
| Regalite ™ R1125 (phr) | — | 5 | — | 5 |
| Kristalex ™ 3100 (phr) | 5 | — | 5 | — |
| Tear Strength (kN/m): | 66.7 | 61.2 | 73.3 | 67.3 |
| Tensile Properties | | | | |
| Tensile Modulus 50% (MPa): | 3.5 | 3.5 | 5.1 | 4.6 |
| Tensile Modulus 100% (MPa): | 4.0 | 4.0 | 5.4 | 4.9 |
| Tensile Modulus 200% (MPa): | 4.1 | 4.3 | 5.4 | 5.1 |
| Tensile Modulus 300% (MPa): | 4.4 | 4.6 | 5.8 | 5.5 |
| Tensile Strength (MPa): | 10.0 | 9.0 | 22.0 | 21.3 |
| Elongation at Break (%): | 1146 | 1122 | 1573 | 1619 |
| Elongation at Yield (%): | 105 | 104 | 85 | 78 |
| Young's modulus: | 1.979 | 1.814 | 2.456 | 2.012 |
| Shore Durometer | | | | |
| Shore A: | 80 | 80 | 90 | 87 |
| Shore D: | 25 | 25 | 35 | 31 |

The addition of KRATON® 1924X or 6670 in the presence of a compatibilizer effectively lowered the Shore A hardness, tensile strength, tensile modulus, and Young's modulus of the copolyester ether. Elongation at break was increased and the tensile strength of the blends was lowered.

Example 7

Blends of COPE, SIBS, Hydrocarbon Resin, and Antioxidant

Eight samples (Sample Nos. 30-37) containing ECDEL™ Elastomer 9966, SIBSTAR™102T (styrene-isobutylene-styrene block copolymer ("SIBS"); Kaneka Texas Corporation, Pasadena, Tex., USA), REGALITE™ R1125 or KRISTALEX™ 3100, CIBA® IRGANOX® 1010 (antioxidant; Ciba Specialty Chemicals Corp., Basel, Switzerland), and BNX® DLTDP (antioxidant; Mayzo, Inc., Suwanee, Ga., USA) were dry blended according to the part ratio listed in Table 7, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water bath and pelletized. The resulting granules obtained from extrusion were further injection molded into plaques having dimensions as described above for physical and mechanical testing. The properties of the molded articles are listed in Table 7, below.

TABLE 7

Composition and Properties of Sample Nos. 30-37

| Sample No.: | 30 | 31 | 32 | 33 | 34 | 35 | 36 | 37 |
|---|---|---|---|---|---|---|---|---|
| Ecdel Elastomer 9966 (wt. %) | 50 | 50 | 70 | 70 | 50 | 50 | 30 | 30 |
| Sibstar ® 102T (wt. %) | 50 | 50 | 30 | 30 | 50 | 50 | 70 | 70 |
| Regalite ™ R1125 (phr) | 5 | 10 | — | — | — | — | — | — |
| Kristalex ™ 3100 (phr) | — | — | 5 | 10 | 5 | 10 | 5 | 10 |
| Ciba ® Irganox ® 1010 (wt. %) | 0.5 | 0.5 | 0.5 | 0.5 | 0.5 | 0.5 | 0.5 | 0.5 |
| BNX ® DLTDP (wt. %) | 0.5 | 0.5 | 0.5 | 0.5 | 0.5 | 0.5 | 0.5 | 0.5 |
| Tear Strength (kN/m): | 57 | 54.3 | 69.3 | 70.2 | 57 | 58 | 42 | 41.5 |

TABLE 7-continued

Composition and Properties of Sample Nos. 30-37

| Sample No.: | 30 | 31 | 32 | 33 | 34 | 35 | 36 | 37 |
|---|---|---|---|---|---|---|---|---|
| Tensile Properties | | | | | | | | |
| Tensile Modulus 100% (MPa): | 4.2 | 3.92 | 6.09 | 5.92 | 4.29 | 4.32 | 2.59 | 2.72 |
| Tensile Modulus 200% (MPa): | 5.25 | 4.97 | 7.58 | 7.07 | 5.29 | 5.21 | 3.28 | 3.44 |
| Tensile Modulus 300% (MPa): | 6.81 | 6.53 | 10.03 | 9.36 | 6.89 | 6.78 | 4.29 | 4.52 |
| Tensile Strength (MPa): | 13.36 | 10.86 | 17.39 | 17.75 | 15.41 | 16.04 | 14.48 | 14.42 |
| Elongation at Break (%): | 626.8 | 537.6 | 552.7 | 580.08 | 683.3 | 710.7 | 867 | 815.3 |
| Shore Durometer | | | | | | | | |
| Shore A: | 84 | 80 | 90 | 90 | 83 | 79 | 66 | 68 |
| Shore D: | 25 | 23 | 35 | 35 | 25 | 25 | 25 | 15 |
| Haze: | 92.1 | 86.7 | 83.1 | 61.2 | 77.1 | 50.6 | 63.7 | 31.8 |
| Tot Trans: | 70.2 | 73.2 | 72.5 | 74.5 | 74.2 | 78.0 | 78.2 | 80.7 |

The combination of SIBSTAR® 102T with both a compatibilizer (REGALITE™ R1125 or KRISTALEX™ 3100) and copolyester ether resulted in an appropriate balance of tensile properties, flexibility, and optical properties that was not achieved in the absence of the compatibilizer.

Example 8

Blends of COPE, EVA, Hydrocarbon Resin, and Antioxidant

Twelve samples (Sample Nos. 38-49) containing ECDEL™ Elastomer 9966, ELVAX® 260 (ethylene vinyl acetate resin; E.I. du Pont de Nemours and Company, Wilmington, Del., USA), REGALITE™ R1125 or KRISTALEX™ 3100, CIBA® IRGANOX® 1010, and BNX® DLTDP were dry blended according to the part ratio listed in Table 8, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water bath and pelletized. The resulting granules obtained from extrusion were further injection molded into plaques having dimensions as described above for physical and mechanical testing. The properties of the molded articles are listed in Table 8, below.

TABLE 8

Composition and Properties of Sample Nos. 38-49

| Sample No.: | 38 | 39 | 40 | 41 | 42 | 43 | 44 | 45 | 46 | 47 | 48 | 49 |
|---|---|---|---|---|---|---|---|---|---|---|---|---|
| Ecdel Elastomer 9966 (wt. %) | 70 | 70 | 50 | 50 | 30 | 30 | 70 | 70 | 50 | 50 | 30 | 30 |
| Elvax ® 260 (wt. %) | 30 | 30 | 50 | 50 | 70 | 70 | 30 | 30 | 50 | 50 | 70 | 70 |
| Regalite ™ R1125 (phr) | — | — | — | — | — | — | 5 | 10 | 5 | 10 | 5 | 10 |
| Kristalex ™ 3100 (phr) | 5 | 10 | 5 | 10 | 5 | 10 | — | — | — | — | — | — |
| Ciba ® Irganox ® 1010 (wt. %) | 0.5 | 0.5 | 0.5 | 0.5 | 0.5 | 0.5 | 0.5 | 0.5 | 0.5 | 0.5 | 0.5 | 0.5 |
| BNX ® DLTDP (wt. %) | 0.5 | 0.5 | 0.5 | 0.5 | 0.5 | 0.5 | 0.5 | 0.5 | 0.5 | 0.5 | 0.5 | 0.5 |
| Tear Strength (kN/m) | 83.4 | 76 | 74.1 | 69.3 | 65.9 | — | 74.5 | 79.3 | 72.4 | 68.5 | 61.8 | — |
| Tensile Properties | | | | | | | | | | | | |
| Tensile Modulus 100% (MPa): | 6.76 | 6.61 | 5.31 | 5.27 | 4.11 | — | 6.73 | 6.42 | 5.33 | 5.12 | 4.05 | — |
| Tensile Modulus 200% (MPa): | 8.07 | 7.67 | 6.32 | 6.13 | 4.78 | — | 8.14 | 7.72 | 6.45 | 6.16 | 4.77 | — |
| Tensile Modulus 300% (MPa): | 10.54 | 10.04 | 8.33 | 8.04 | 5.87 | — | 10.66 | 10.08 | 8.38 | 7.89 | 5.91 | — |
| Tensile Strength (MPa): | 15.91 | 16.2 | 14.68 | 14.05 | 11.52 | — | 16.36 | 15.37 | 14.18 | 12.54 | 12.18 | — |

TABLE 8-continued

Composition and Properties of Sample Nos. 38-49

| Sample No.: | 38 | 39 | 40 | 41 | 42 | 43 | 44 | 45 | 46 | 47 | 48 | 49 |
|---|---|---|---|---|---|---|---|---|---|---|---|---|
| Elongation at Break (%): | 508 | 523.6 | 596.1 | 572 | 683.3 | — | 512.9 | 515.8 | 581.7 | 552.5 | 719.6 | — |
| Shore Durometer | | | | | | | | | | | | |
| Shore A: | 95 | 95 | 90 | 90 | 87 | — | 93 | 90 | 90 | 90 | 90 | — |
| Shore D: | 40 | 39 | 35 | 35 | 28 | — | 40 | 40 | 35 | 33 | 30 | — |
| Haze: | 96.37 | 96.67 | 93.2 | 96.34 | 97.2 | — | 90.32 | 83.47 | 85.79 | 84.29 | 90.69 | — |
| Tot Trans: | 60.64 | 58.35 | 64.39 | 58.86 | 60.95 | — | 65.49 | 67.67 | 70.03 | 72.38 | 70.11 | — |

The addition of ELVAX® 260 did not as effectively lower the Shore A hardness, and the contact clarity of these blends was poorer. Data was not provided for Sample Nos. 43 and 49 because it was clear from visual inspection that their tensile strengths were too low.

Example 9

Tubing Comparison

A system was set up to produce tubing made from compositions described herein. The tubing line consisted of an extruder, three-stage water bath, and a puller. The extruder contained a 3.8-cm single screw with a compression ratio of 2.6:1 and an L/D of 24:1. The extruder was equipped with a special die that consisted of a bushing and a mandrel, which is required for extruding tubing. The bushing and mandrel used in this Example was capable of producing tubing with an outer diameter of 0.6 cm. The extruder conditions are listed in Table 9, below.

The three stage water bath was attached to a track that enabled one to adjust the distance to and from the extruder die. Adjustments could be made vertically and horizontally (i.e., forward, backward, left, or right). It was important to ensure that the exit of the die was in line with the entrance of the water bath. A sizing sleeve was mounted at the entrance of the water bath. The O.D. of the sizing sleeve was 0.7 cm. Each section of the water bath was separated with a rubber gasket. Each gasket contained a hole to allow the extruded tubing to move through. The water bath was equipped with a circulation pump. This allowed fresh cold water to flow through the bath. At the end of the water bath, air was blown onto the tubing prior to entering the puller system. This allowed the tubing to dry. The speed of the puller system was considered in the extrusion of the tubing. Fine adjustments needed to be made to ensure that the tubing would pull through the water bath. Too slow of a speed would cause the material to build up at the entrance of the water bath. Too fast of a speed would decrease the O.D. of the tubing. Puller speeds are shown in Table 9, below.

Five tubes (Sample Nos. 50-54) were prepared using the above procedure. The compositions of these samples are listed in Table 9, below.

TABLE 9

Composition and Properties of Sample Nos. 50-54

| | Sample No.: | | | | |
|---|---|---|---|---|---|
| | 50 | 51 | 52 | 53 | 54 |
| Material Description | Ecdel 9967 | Ecdel 9966 60%, Sibstar® 102T 37%, Regalite™ R1125 3% | | | Ecdel 9966 70%, Kraton® G1643 M 27%, Regalite™ R1125 3% |
| Zone 1 | 188° C. | 188° C. | 188° C. | 188° C. | 188° C. |
| Zone 2 | 212° C. | 210° C. | 220° C. | 230° C. | 215° C. |
| Zone 3 | 212° C. | 210° C. | 220° C. | 230° C. | 215° C. |
| Clamp | 228° C. | 220° C. | 230° C. | 240° C. | 215° C. |
| Die Band Heater | 228° C. | 220° C. | 230° C. | 240° C. | 215° C. |
| Internal Die | 228° C. | 220° C. | 230° C. | 240° C. | 215° C. |
| Extruder Speed (rpm) | 4.9 | 4.9 | 4.9 | 4.9 | 4.9 |
| Amp | 41.8 | 20.2 | 20 | 20 | 19.6 |
| Pressure (MPa) | 7.9 | — | — | — | 3.0 |
| Puller Speed (rpm) | 33.7 | 28 | 25 | 28.5 | 23.9 |

Tubing prepared from only ECDEL™ Elastomer 9967 (Sample No. 50) exhibited poor kink resistance and did not have the desired softness and flexibility. Tubing prepared from the blends (Sample Nos. 51-54) exhibited good contact clarity. Also, the tubing prepared from the blends had adequate kink resistance, softness, and flexibility.

Example 10

Tubing Prepared From Blends of COPE, SIS, Hydrocarbon Resin, and SEPS or SEBS

Eight samples (Sample Nos. 55-62) containing ECDEL™ Elastomer 9966, HYBRAR™ 7311 (hydrogenated styrene-vinylisoprene-isoprene-styrene block copolymer; Kuraray America, Inc., Pasadena, Tex., USA), REGALITE™ R1125, and either KRATON® 6670 or KRATON® G1643M were dry blended according to the part ratio listed in Table 10, below, and dried at 56° C. for 4 hours. The dry blend was compounded using a Werner & Pfleiderer WP-30A 30-mm co-rotating twin screw extruder at 450 rpm. The different zone temperatures were from 190 to 230° C. Strands of the resulting samples were cooled in a water-bath and pelletized. The resulting granules obtained from extrusion were processed into tubing as described above in Example 9. The physical properties are listed in Table 10, below.

TABLE 10

Composition and Properties of Sample Nos. 55-62

| Sample No.: | 55 | 56 | 57 | 58 | 59 | 60 | 61 | 62 |
|---|---|---|---|---|---|---|---|---|
| Ecdel Elastomer 9966 (wt. %) | 70 | 70 | 70 | 70 | 70 | 70 | 70 | 70 |
| Hybrar ™ 7311 (wt. %) | 27 | 27 | 22 | 22 | 22 | 22 | 22 | 22 |
| Regalite ™ R1125 (wt. %) | 3 | 3 | 3 | 3 | 3 | 3 | 3 | 3 |
| Kraton ® 6670 (wt. %) | — | — | 5 | — | — | — | — | — |
| Kraton G1643M (wt. %) | — | — | — | 5 | 5 | 5 | 5 | 5 |
| Processing Temperature (° C.) | 205 | 210 | 208 | 205 | 210 | 215 | 220 | 230 |
| Yellowness Index | 18 | — | 13 | 13 | 13 | 15 | 6 | 6 |
| Haze % | 92 | — | 89 | 94 | 94 | 96 | 89 | 89 |
| White Index | 12 | — | 24 | 22 | 14 | 12 | 47 | 50 |
| % Ultimate Strain | 418 | 470 | 576 | 493 | 468 | 458 | 480 | 465 |
| Ultimate Tensile Strength (N) | 100.1 | 105.0 | 136.6 | 130.8 | 136.1 | 125.4 | 130.8 | 90.7 |

The combination of HYBRAR™ 7311 with a compatibilizer (REGALITE™ R1125) and copolyester ether resulted in tubing having adequate tensile properties and contact clarity. The addition of KRATON® G1643 M improved both the contact clarity and tensile strength of the tubing.

Example 11

Multilayer Tubing

A multilayer tube (Sample No. 63), where the outer layer was comprised of the blend listed in Table 11, below, prepared according to the same procedure employed in Example 5, above, the inner layer was a low-density polyethylene ("LDPE"), and the intermediate bonding layer was EVA, was coextruded using conventional techniques (see, for example, U.S. Pat. No. 4,627,844 describing techniques for coextruding a multi-layer tube). The tubing was soft, flexible, had excellent contact clarity, and had desirable tensile properties. The outer layer was capable of achieving adequate bonding strength with both polyvinyl chloride ("PVC") and polycarbonate luers using either cyclohexanone (solvent), Loctite®, or UV cured bonding techniques.

TABLE 11

Outer Layer Composition of Sample No. 63

| | Sample No.: |
|---|---|
| | 63 |
| Ecdel 9966 (wt. %) | 70 |
| Kratoe ® G1643 M (wt. %) | 5 |
| Hybrar ™ 7311 (wt. %) | 22 |
| Regalite ™ R1125 (wt. %) | 3 |

Example 12

Dual Layer Tubing

Two dual layer tubes (Sample Nos. 64 and 65), where the outer layers were respectively comprised of the blends listed in Table 12, below, and the inner layers were comprised of LDPE, were extruded using conventional techniques. Each tube was soft, flexible, had excellent contact clarity, and had desirable tensile properties. The outer layer of each tube was capable of achieving adequate bonding strength with both PVC and polycarbonate luers using either cyclohexanone (solvent), Loctite®, or UV cured bonding techniques.

TABLE 12

Outer Layer Composition of Sample Nos. 64 and 65

| | Sample No.: | |
|---|---|---|
| | 64 | 65 |
| Ecdel Elastomer 9966 (wt. %) | 70 | 70 |
| Kratone ® G1643 M (wt. %) | 27 | 5 |
| Hybrar ™ 7311 (wt. %) | — | 22 |
| Regalite ™ R1125 (wt. %) | 3 | 3 |

Example 13

Single Layer Tubing

Seven single layer tubes (Sample Nos. 66-72) comprising either blend listed in Table 12, above, were extruded at various temperatures. Each tube was soft, flexible and had adequate contact clarity. Each of the tubes was capable of achieving adequate bonding strength with both PVC and polycarbonate luers using either cyclohexanone (solvent), Loctite®, or UV cured bonding techniques. Suitable extrusion temperatures for Sample Nos. 66-69 ranged from 200 to 260° C. Suitable extrusion temperatures for Sample Nos. 70-72 ranged from 200 to 230° C. Tensile properties of these single layer tubes are provided in Table 13, below. The tubing provided excellent dimensional stability after steam autoclave sterilization.

TABLE 13

Composition and Properties of Sample Nos. 66-72

| Sample No. | Composition Sample No. (from Table 12) | Processing Temperature (° C.) | Stress at Break (MPa) | Stress at 100% Strain (MPa) | Strain at Break (%) | Average Outside Diameter (mm) | Average Wall Thickness (mm) |
|---|---|---|---|---|---|---|---|
| 66 | 65 | 210 | 19.6 | 8.3 | 1026.8 | 3.61 | 0.63 |
| 67 | 65 | 221 | 19.9 | 7.5 | 947.3 | 3.64 | 0.62 |

TABLE 13-continued

Composition and Properties of Sample Nos. 66-72

| Sample No. | Composition Sample No. (from Table 12) | Processing Temperature (° C.) | Stress at Break (MPa) | Stress at 100% Strain (MPa) | Strain at Break (%) | Average Outside Diameter (mm) | Average Wall Thickness (mm) |
|---|---|---|---|---|---|---|---|
| 68 | 65 | 238 | 18.8 | 7.2 | 994.5 | 3.71 | 0.64 |
| 69 | 65 | 254 | 18.4 | 7.2 | 1000.1 | 3.69 | 0.67 |
| 70 | 64 | 210 | 18.3 | 8.3 | 965.2 | 3.59 | 0.55 |
| 71 | 64 | 221 | 15.6 | 7.2 | 905.5 | 3.54 | 0.45 |
| 72 | 64 | 238 | 8.6 | 6.7 | 565.4 | 3.40 | 0.48 |

DEFINITIONS

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/−37° F.), an intermediate numerical range of 43° F. to 81° F. (62° F.+/−19° F.), and a narrow numerical range of 53° F. to 71° F. (62° F.+/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A composition comprising:
   (a) a copolyester ether comprising a polyester segment and a polyether segment, wherein:
      the polyester segment primarily comprises residues of an aliphatic diol and either an aliphatic dicarboxylic acid or an ester of an aliphatic dicarboxylic acid, and
      the polyether segment primarily comprises a polyalkylene glycol;
   (b) a thermoplastic elastomer; and
   (c) a compatibilizer resin,
   wherein said copolyester ether, said thermoplastic elastomer, and said compatibilizer resin are present as a physical mixture in said copolyester ether elastomer composition.

2. The composition of claim 1, wherein said composition is substantially free of plasticizers, wherein said composition is substantially free of oils having a molecular weight of less than 1,000 g/mol, wherein said composition is substantially free of polyvinyl chloride, wherein said composition is substantially free of polycarbonates.

3. The composition of claim 1, wherein said composition is solvent bondable to a polyvinyl chloride and/or a polycarbonate substrate.

4. The composition of claim 1, wherein said composition has a Shore A hardness in the range of from about 60 to about 90, wherein said composition has a softening point greater than 144° C.

5. The composition of claim 1, wherein said composition has a tensile strength in the range of from about 10 to about 20 MPa, wherein said composition has a Young's modulus in the range of from about 0.5 to about 5 MPa.

6. The composition of claim 1, wherein said composition has a clarity of at least 25, wherein said composition has a transmittance of at least 70 percent.

7. The composition of claim 1, wherein the combined concentration of said copolyester ether, said thermoplastic elastomer, and said compatibilizer resin is at least 75 weight percent based on the entire weight of said composition.

8. The composition of claim 1, wherein said thermoplastic elastomer comprises a styrene block copolymer.

9. The composition of claim 1, wherein said polyester segment constitutes in the range of from about 70 to about 90 weight percent of said copolyester ether, wherein said polyether segment constitutes in the range of from about 10 to about 30 weight percent of said copolyester ether.

10. The composition of claim 1, wherein said polyalkylene glycol is selected from the group consisting of polyethylene glycol, polypropylene glycol, polytetramethylene glycol, and mixtures of two or more thereof.

11. The composition of claim 1, wherein said copolyester ether has an inherent viscosity in the range of from about 0.6 to about 1.5.

12. The composition of claim 1, wherein said compatibilizer resin is substantially free of reactive functional groups, wherein said compatibilizer resin comprises a resin selected from the group consisting of hydrocarbon resins, terpene resins, rosin esters, ester amide resins, low molecular weight polyester resins, and mixtures of two or more thereof, wherein said compatibilizer resin has a number average molecular weight in the range of from about 1,500 to about 5,000.

13. The composition of claim 1, wherein said thermoplastic elastomer comprises a styrene block copolymer and/or an ethylene vinyl acetate copolymer.

14. The composition of claim 1, wherein said composition comprises said copolyester ether in an amount in the range of from about 20 to about 98 weight percent, wherein said composition comprises said thermoplastic elastomer in an amount in the range of from about 1 to about 80 weight percent, wherein said composition comprises said compatibilizer resin in an amount in the range of from about 1 to about 10 weight percent, wherein the combined concentration of said copolyester ether, said thermoplastic elastomer, and said compatibilizer resin is at least 99 weight percent based on the entire weight of said composition.

15. The composition of claim 1, wherein said composition comprises less than 1 weight percent each of barium sulfate, ethylene-acrylate ester-maleic anhydride copolymers, fiberglass, epoxy-containing compounds, polyamides, polyacrylates, flame retardants, lactic acid polymers, and cross-linking agents, based on the entire weight of said composition.

16. A process for preparing a copolyester ether elastomer composition, said process comprising admixing a copolyester ether, a thermoplastic elastomer, and a compatibilizer resin,
wherein said copolyester ether comprises a polyester segment and a polyether segment, wherein the polyester segment primarily comprises residues of an aliphatic diol and either an aliphatic dicarboxylic acid or an ester of an aliphatic did, and the polyether segment primarily comprises a polyalkylene glycol,
wherein said copolyester ether, said thermoplastic elastomer, and said compatibilizer resin remain a physical mixture in the resulting copolyester ether elastomer composition.

17. The process of claim 16, further comprising extruding said copolyester ether elastomer composition.

18. The process of claim 16, wherein said copolyester ether elastomer composition is substantially free of plasticizers, wherein said copolyester ether elastomer composition is substantially free of oils having a molecular weight of less than 1,000 g/mol, wherein said copolyester ether elastomer composition is substantially free of polyvinyl chloride, wherein said copolyester ether elastomer composition is substantially free of polycarbonates.

19. The process of claim 16, wherein said copolyester ether elastomer composition has a softening point greater than 144° C., wherein said copolyester ether elastomer composition has a Shore A hardness in the range of from about 60 to about 90, wherein said copolyester ether elastomer composition has a tensile strength in the range of from about 10 to about 20 MPa, wherein said copolyester ether elastomer composition has a Young's modulus in the range of from about 0.5 to about 5 MPa.

20. The process of claim 16, wherein said copolyester ether elastomer composition comprises said copolyester ether in an amount in the range of from about 20 to about 98 weight percent, wherein said copolyester ether elastomer composition comprises said thermoplastic elastomer in an amount in the range of from about 1 to about 80 weight percent, wherein said copolyester ether elastomer composition comprises said compatibilizer resin in an amount in the range of from about 1 to about 10 weight percent, wherein the combined concentration of said copolyester ether, said thermoplastic elastomer, and said compatibilizer resin is at least 99 weight percent based on the entire weight of said copolyester ether elastomer composition, wherein said copolyester ether comprises a polyester segment primarily comprising monomer residues of an aliphatic diol and an aliphatic dicarboxylic acid or an ester thereof, wherein said copolyester ether comprises a polyether segment primarily comprising a polyalkylene glycol, wherein said thermoplastic elastomer comprises a styrene block copolymer, wherein said compatibilizer resin comprises a hydrocarbon resin.

21. An article of manufacture comprising a copolyester ether elastomer composition, said copolyester ether elastomer composition comprising:
(a) a copolyester ether comprising a polyester segment and a polyether segment, wherein the polyester segment primarily comprises residues of an aliphatic diol and either an aliphatic dicarboxylic acid or an ester thereof, and the polyether segment primarily comprises a polyalkylene glycol;
(b) a styrene block copolymer; and
(c) a compatibilizer resin,
wherein said copolyester ether, said styrene block copolymer, and said compatibilizer resin are present as a physical mixture in said copolyester ether elastomer composition.

22. The article of claim 21, wherein said article of manufacture is a laboratory tube, a medical application tube, a blood bag, or an IV solution bag.

23. The article of claim 21, wherein said copolyester ether elastomer composition is substantially free of plasticizers, wherein said copolyester ether elastomer composition is substantially free of oils having a molecular weight of less than 1,000 g/mol, wherein said copolyester ether elastomer composition is substantially free of polyvinyl chloride, wherein said copolyester ether elastomer composition is substantially free of polycarbonates.

24. The article of claim 21, wherein said copolyester ether elastomer composition has a softening point greater than 144° C., wherein said copolyester ether elastomer composition has a Shore A hardness in the range of from about 60 to about 90, wherein said copolyester ether elastomer composition has a tensile strength in the range of from about 10 to about 20 MPa, wherein said copolyester ether elastomer composition has a Young's modulus in the range of from about 0.5 to about 5 MPa.

25. The article of claim 21, wherein said copolyester ether elastomer composition comprises said copolyester ether in an amount in the range of from about 20 to about 98 weight percent, wherein said copolyester ether elastomer composition comprises said styrene block copolymer in an amount in the range of from about 1 to about 80 weight percent, wherein said copolyester ether elastomer composition comprises said compatibilizer resin in an amount in the range of from about 1 to about 10 weight percent, wherein the combined concentration of said copolyester ether, said styrene block copolymer, and said hydrocarbon resin is at least 99 weight percent based on the entire weight of said copolyester ether elastomer composition.

* * * * *

UNITED STATES PATENT AND TRADEMARK OFFICE
CERTIFICATE OF CORRECTION

| | | |
|---|---|---|
| PATENT NO. | : 8,178,647 B2 | Page 1 of 1 |
| APPLICATION NO. | : 12/868373 | |
| DATED | : May 15, 2012 | |
| INVENTOR(S) | : Hawkins et al. | |

It is certified that error appears in the above-identified patent and that said Letters Patent is hereby corrected as shown below:

Column 26, Line 1, Claim 16 "aliphatic did" should read --aliphatic diol--.

Signed and Sealed this
Thirtieth Day of October, 2012

David J. Kappos
*Director of the United States Patent and Trademark Office*